United States Patent [19]

Ikeda et al.

[11] Patent Number: 5,970,032
[45] Date of Patent: *Oct. 19, 1999

[54] FOCUS CONTROL METHOD, AND OPTICAL DISK UNIT WITH FOCUS OFFSET CORRECTION

[75] Inventors: Toru Ikeda; Akira Minami, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/625,289

[22] Filed: Apr. 1, 1996

[30] Foreign Application Priority Data

Jun. 15, 1995 [JP] Japan .................................. 7-148778

[51] Int. Cl.⁶ .................................................. G11B 7/095
[52] U.S. Cl. .......................................... 369/44.29; 369/54
[58] Field of Search ............................ 369/44.25, 44.27, 369/44.29, 44.32, 44.34, 44.35, 44.36, 54

[56] References Cited

U.S. PATENT DOCUMENTS 4,707,648  11/1987  Minami .
4,942,564  7/1990   Hofer et al. .
5,077,719  12/1991  Yanagi et al. .................. 369/44.29 X
5,097,458  3/1992   Suzuki .............................. 369/44.34
5,142,520  8/1992   Yanagi et al. .................. 369/44.34 X
5,251,194  10/1993  Yoshimoto et al. .

FOREIGN PATENT DOCUMENTS 62-128027  6/1987  Japan .
62-141644  6/1987  Japan .
62-222438  9/1987  Japan .
2-230516   9/1990  Japan .
875354     6/1987  Rep. of Korea .

*Primary Examiner*—W. R. Young
*Attorney, Agent, or Firm*—Greer, Burns & Crain Ltd.

[57] ABSTRACT

A focus control method controls a focus servo system which controls a focus of a light irradiated on an optical disk in an optical disk unit which has a plurality of operation modes. The focus control method includes the steps of (a) reading focus offset information from a memory which prestores focus offset information depending on the operation modes of the optical disk unit, and (b) controlling the focus with respect to the optical disk by supplying the focus offset information read in the step (a) to the focus servo system when the operation mode of the optical disk unit is switched from one mode to another.

26 Claims, 13 Drawing Sheets

INTERRUPT AT RISING EDGE OF WG
INTERRUPT DETECTION

S 241 — READ ADDED OFFSET VALUE FROM RAM, OUTPUT TO DAC

S 242 — RETURN

INTERRUPT AT FALLING EDGE OF WG
INTERRUPT DETECTION

S 245 — READ 4TH OFFSET VALUE FROM RAM, OUTPUT TO DAC

S 246 — RETURN

FOCUS CONTROL METHOD, AND OPTICAL DISK UNIT WITH FOCUS OFFSET CORRECTION

BACKGROUND OF THE INVENTION

The present invention generally relates to focus control methods and optical disk units, and more particularly to a focus control method which corrects an offset in a focus servo system and to an optical disk unit which employs such a focus control method.

FIG. 1 is a system block diagram showing an example of a conventional optical disk unit. In FIG. 1, a laser beam emitted from a laser diode (LD) 101 of an optical head 100 is irradiated on an optical disk 103 which is rotated by a spindle motor 103. The reflected laser beam from the optical disk 103 is converted into an electrical signal by a photodetector 104 within the optical head 100. A laser diode control circuit 105 controls the laser diode 101 based on a gate signal which is for a write/erase/read mode and is received from a host unit (not shown), so that the laser diode 101 emits the laser beam with an optimum light emitting power for each mode.

A reproducing circuit 106 separates the frequency band of the electrical signal which is received from the photodetector 104 of the optical head 100, and a high-frequency component signal from the reproducing circuit 106 is supplied to a radio frequency (RF) signal generating circuit (not shown) which reproduces data. On the other hand, a low-frequency component signal from the reproducing circuit 106 is supplied to a tracking servo system 107 and a focus servo system. The tracking servo system 107 generates a tracking error signal based on the low-frequency component signal and supplies this tracking error signal to the optical head 100 so as to carry out a tracking servo. On the other hand, the focus servo system 108 generates a focus error signal based on the low-frequency component signal and supplies this focus error signal to the optical head 100 so as to carry out a focus servo.

However, the conventional optical disk unit had problems (1) through (3) which are described hereunder.

(1) In the case of the optical disk unit in which the light emitting power of the laser diode 101 is switched depending on the write/erase/read mode, a so-called mode hop occurs whereby the oscillation wavelength of the laser diode 101 switches depending on the mode, and there was a problem in that the focal point moves. The amount or extent of mode hop differs among each individual laser diode 101, and also changes depending on the temperature.

FIGS. 2(A) through 2(C) are timing charts for explaining a distortion in the focus servo due to the switching of the light emitting power. In FIG. 2(A) shows a normal focus error signal FES, FIG. 2(B) shows the focus error signal FES when the focus servo is distorted depending on the mode, and FIG. 2(C) shows a write gate signal WG. It may be seen from FIGS. 2(A) through 2(C) that a focus error is generated when the light emitting power of the laser diode 101 is switched and that the focal point is returned to the in-focus position by the focus servo. Such a focus error is generated immediately after the start of the write and immediately after the end of the write when the light emitting power of the laser diode 101 is switched. Particularly the focus error which is generated immediately after the start of the write greatly affects the write performance, and easily becomes the cause of a reproduction error during the read. In addition, there was also a problem in that the focus servo is distorted at a constant period and noise is generated thereby.

In FIG. 2(C), a high-level period of the write gate signal WG indicates a write/erase mode, and a low-level period of the write gate signal WG indicates a read mode. In other words, in the particular case shown in FIGS. 2(A) through 2(C), the write/erasure of data is carried out with respect to the optical disk 103 during the high-level period of the write gate signal WG, and an identification (ID) signal is read during the low-level period of the write gate signal WG.

(2) In a fixed optical system of the optical disk unit, the positions of the photodetector and the like are adjusted so that the focus servo can be made to the optimum in-focus position by the fixed optical system alone. However, there was a problem in that the focus servo may be made to a position different from the adjusted in-focus position due to the mounting error that occurs when the fixed optical system is mounted on a base of the optical disk unit and due to an offset of a circuit which processes an output signal of the fixed optical system.

(3) Furthermore, when a temperature change occurs, the positions and angles of optical parts deviate from their original correct positions depending on the difference between the coefficients of thermal expansion of the optical parts and the fixed parts and depending on the temperature characteristic of an adhesive agent or the like that is used to fix the optical parts. For this reason, an offset is generated in the focusing direction due to the temperature change, and there was a problem in that the focus servo may be made to a position deviated from the optimum in-focus position.

If any one of the problems (1) through (3) described above becomes the cause and the focus servo is not made to the optimum in-focus position, a write error and/or a read error occurs.

With respect to the problems (2) and (3), that is, with respect to the problem of the focus servo being made to a position deviated from the optimum in-focus position, it is possible to reduce the undesirable effects to a certain extent by making an adjustment so that the amplitude of the tracking error signal becomes a maximum. For example, such a method is proposed in Japanese Laid-Open Patent Applications No.62-128027, No.62-141644, No.62-222438 and No.2-230516. However, with respect to the problem (2), it is necessary to make one adjustment during the time from a time when the optical disk is loaded into the optical disk unit to a time when the optical disk unit assumes a ready state. In addition, with respect to the problem (3), it is necessary to make the adjustment every time a temperature change occurs. For these reasons, there still were problems in that it takes time to make the necessary adjustments and that the performance of the optical disk unit deteriorates.

SUMMARY OF THE INVENTION

Accordingly, it is a general object of the present invention to provide a novel and useful focus control method and optical disk unit, in which the problems described above are eliminated.

Another and more specific object of the present invention is to provide a focus control method which positively corrects the focus error caused by the mounting error of the optical system and the temperature change, so as to improve the write/erase/read margin.

Still another object of the present invention is to provide an optical disk unit which positively corrects the focus error caused by the mounting error of the optical system and the temperature change, so as to improve the write/erase/read margin.

A further object of the present invention is to provide a focus control method which controls a focus servo system for controlling a focus of a light irradiated on an optical disk in an optical disk unit which has a plurality of operation modes, comprising the steps of (a) reading focus offset information from memory means which prestores focus offset information depending on the operation modes of the optical disk unit, and (b) controlling the focus with respect to the optical disk by supplying the focus offset information read in the step (a) to the focus servo system when the operation mode of the optical disk unit is switched from one mode to another. According to the focus control method of the present invention, it is possible to positively correct the focus error caused by mode-hop of a light source, mounting error or an optical system and a temperature change, and to improve the write/erase/read margin. In addition, it is possible to satisfactorily correct the focus error immediately after the start or end of the write/erase, the focus error at the time when the power of the optical disk unit is turned ON, the focus error caused by the temperature change within the optical disk unit and the like, by using an focus offset value. Furthermore, by measuring and storing in advance various focus offset values using a learning function, it becomes possible to control the focus position to an optimum in-focus position depending on the characteristic of the individual optical disk unit and the operating environment. Therefore, the focus position can always be controlled to the optimum in-focus position to suit the operation mode and the operating environment of the optical disk unit.

Another object of the present invention is to provide an optical disk unit comprising a focus servo system controlling a focus of a light irradiated on an optical disk, memory means for storing focus offset information depending on a plurality of operation modes of the optical disk unit, and control means for correcting a focus error with respect to the optical disk by supplying a focus offset value which is based on the focus offset information read from the memory means to the focus servo system at a time when the operation mode of the optical disk unit is switched from one mode to another. According to the optical disk unit of the present invention, it is possible to positively correct the focus error caused by mode-hop of a light source, mounting error or an optical system and a temperature change, and to improve the write/erase/read margin. In addition, it is possible to satisfactorily correct the focus error immediately after the start or end of the write/erase, the focus error at the time when the power of the optical disk unit is turned ON, the focus error caused by the temperature change within the optical disk unit and the like, by using an focus offset value. Furthermore, by measuring and storing in advance various focus offset values using a learning function, it becomes possible to control the focus position to an optimum in-focus position depending on the characteristic of the individual optical disk unit and the operating environment. Therefore, the focus position can always be controlled to the optimum in-focus position to suit the operation mode and the operating environment of the optical disk unit.

Other objects and further features of the present invention will be apparent from the following detailed description when read in conjunction with the accompanying drawings.

DESCRIPTION OF THE PREFERRED EMBODIMENTS

First, a description will be given of the general construction of a first embodiment of an optical disk unit according to the present invention, by referring to FIG. 3.

Figure 1:
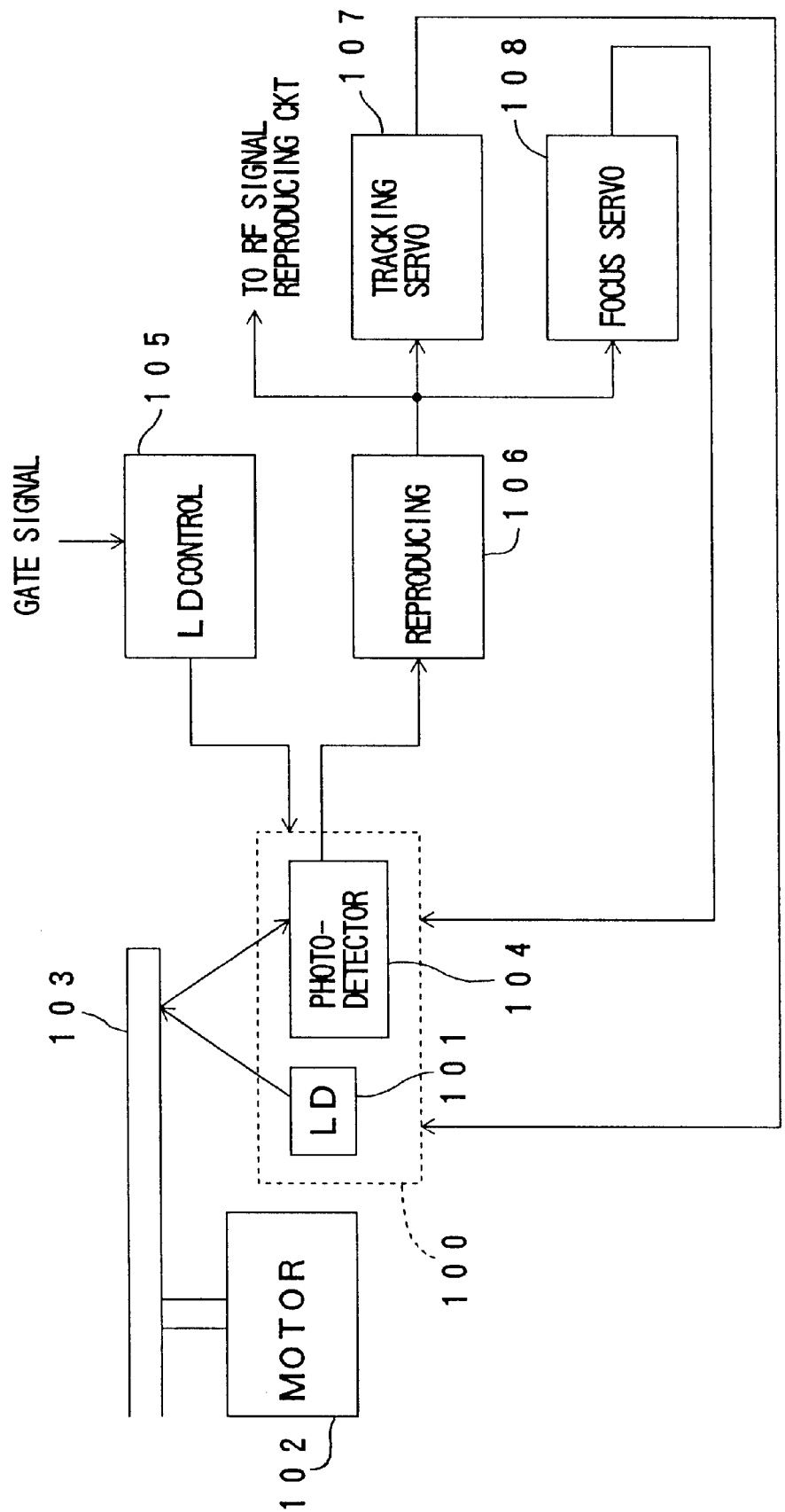
FIG. 1 is a system block diagram showing an example of a conventional disk unit.
Figure 2:
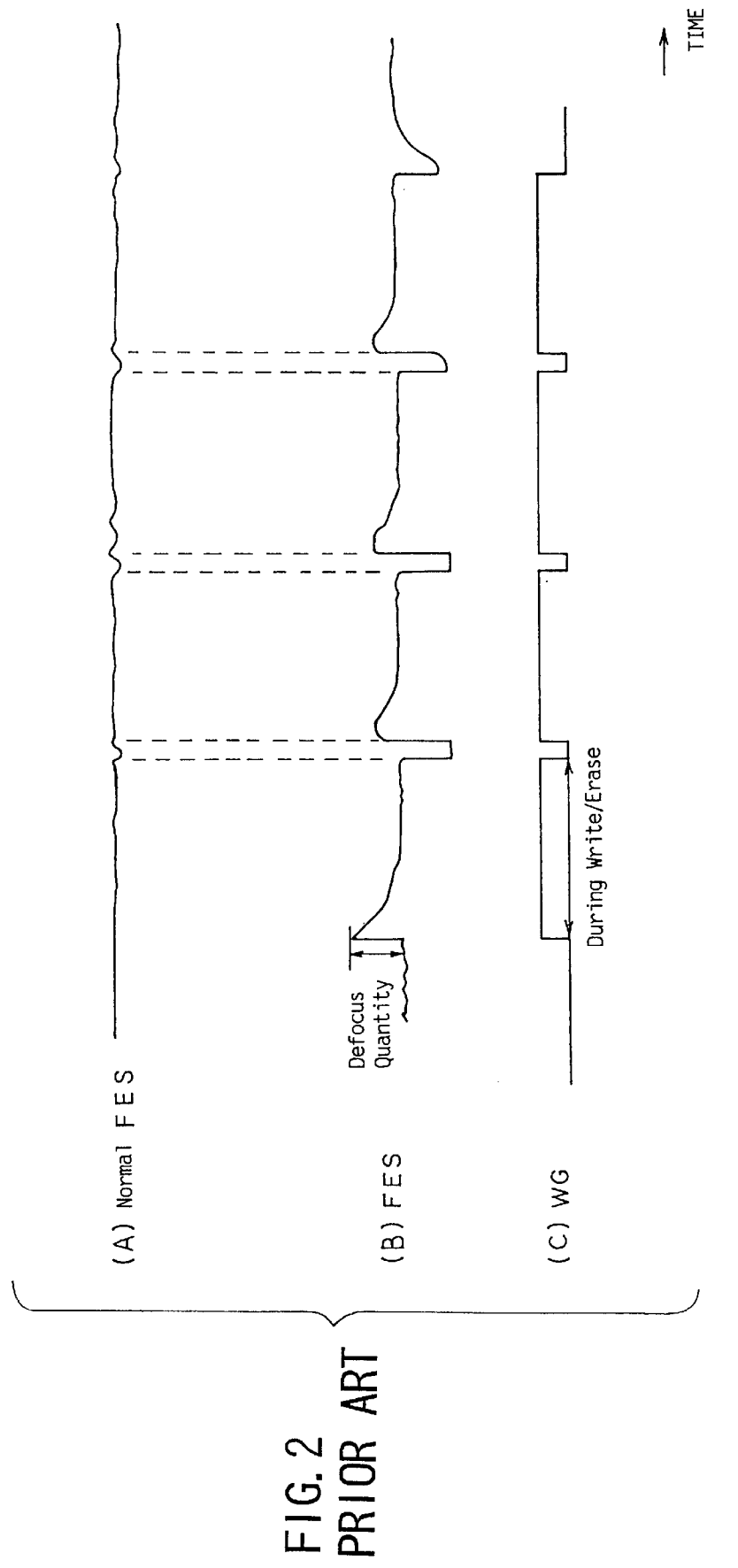
FIG. 2(including subparts A–C) is a timing chart for explaining a distortion in a focus servo due to switching of a light emitting power of a laser diode.
Figure 3A:
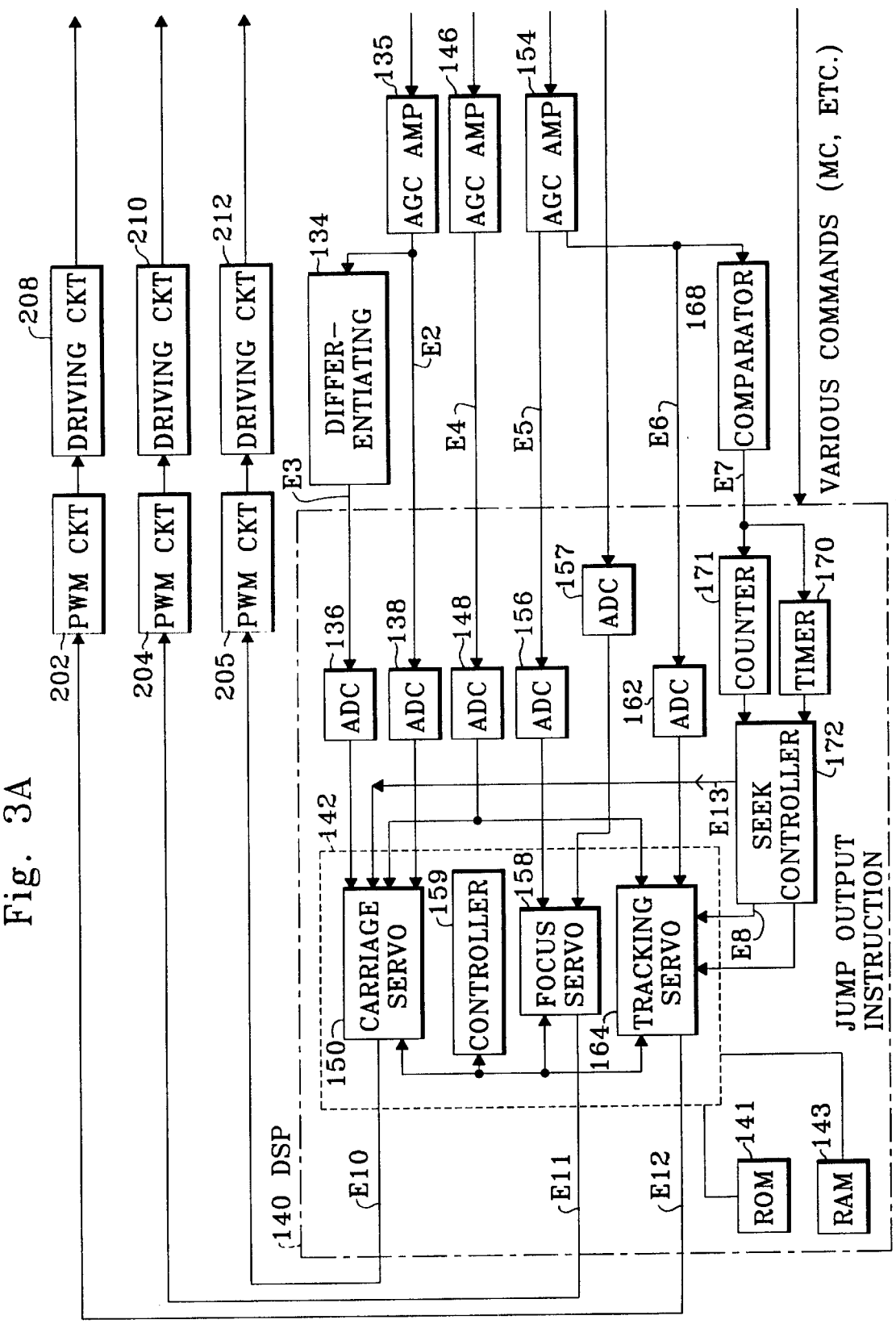
FIG. 3 is a system block diagram showing the general construction of a first embodiment of an optical disk unit according to the present invention.
Figure 3B:
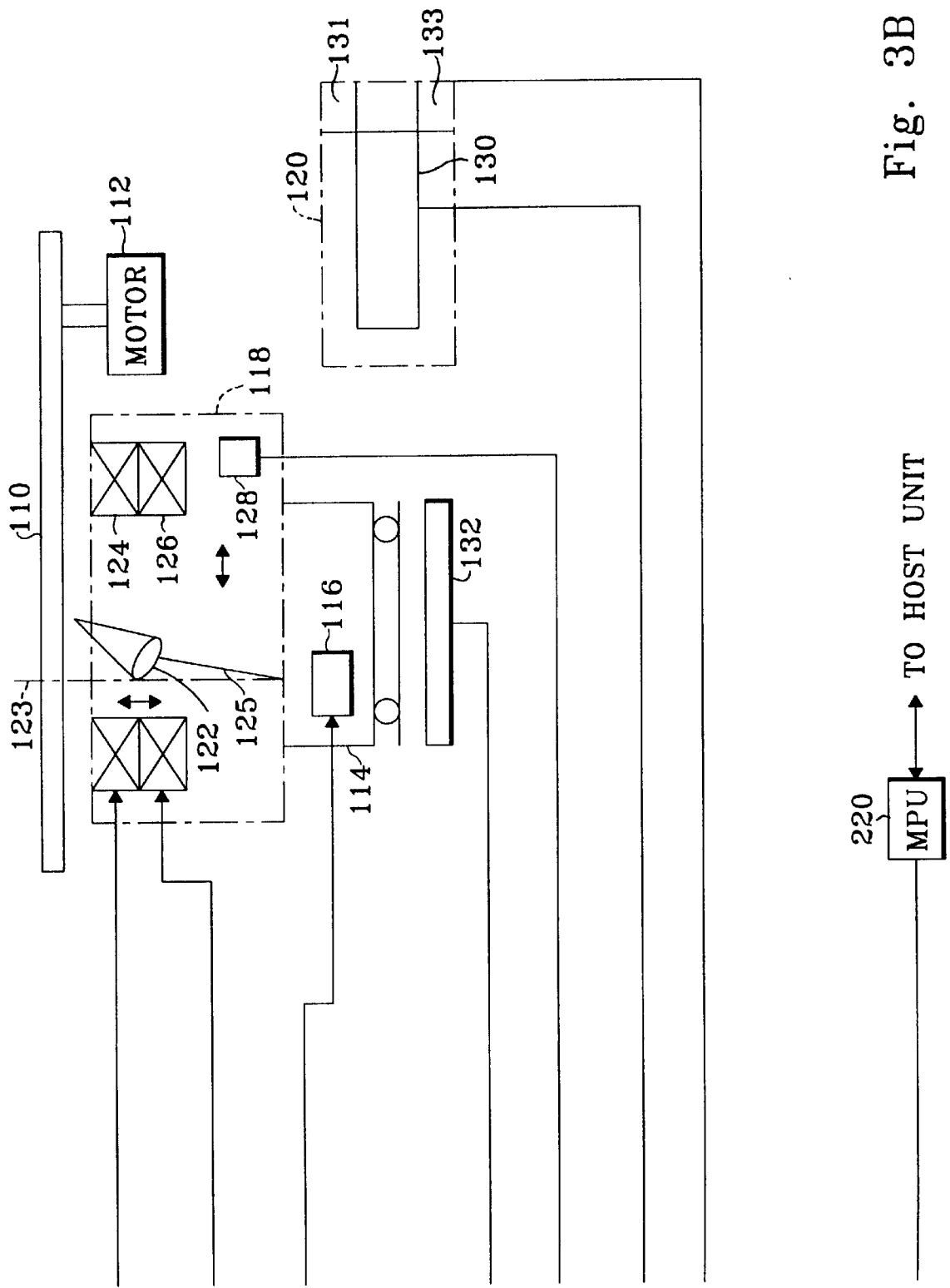

In FIG. 3, an optical disk 110 is accommodated within a cartridge (not shown), for example, and information can be read from and written to this optical disk 110 optically. When the cartridge of the optical disk 110 is loaded into the optical disk unit, the optical disk 110 is loaded onto a rotary shaft of a spindle motor 112 by a loading mechanism (not shown). The spindle motor 112 rotates the optical disk 110 at a constant speed.

A carriage 114 is arranged so that it is movable with respect to a radial direction of the optical disk 110. A movable optical head part 118 is mounted on the carriage 114. The carriage 114 is moved in the radial direction of the optical disk 110 by a carriage driving coil 116. More particularly, a voice coil motor is used as the carriage driving coil 116.

An objective lens 122 is provided on the movable optical head part 118 which is mounted on the carriage 114. The objective lens 122 converges a laser beam which is emitted from a laser diode (light source) 131 of a stationary optical head part 120 on a medium surface of the optical disk 110 so as to form a beam spot. The objective lens 122 is driven by a lens actuator 126 which is provided with a track actuator driving coil 124, and the objective lens 122 is used to move the beam spot in the radial direction of the optical disk 110. The lens actuator 125 is also referred to as a track actuator.

The range in which the beam spot is movable by the objective lens 122 is to one side of a lens center 123, that is, 32 tracks, for example. In addition, the objective lens 122 is moved in an optical axis direction by a focus actuator driving coil 126, so as to carry out a focus control to image a predetermined beam spot on the medium surface of the optical disk 110.

Furthermore, a lens position sensor 128 is provided in the movable optical head part 118. The lens position sensor 128 detects the position of the objective lens 122. In other words, when the objective lens 122 is located at the lens center 123, a lens position signal E4 which is obtained from an automatic gain control (AGC) amplifier 146 is 0 V. For example, the lens position signal E4 becomes a positive polarity signal voltage depending on the moving quantity of the objective lens 122 as the objective lens 122 moves towards the inner side of the optical disk 110, and becomes a negative polarity signal voltage depending on the moving quantity of the objective lens 122 as the objective lens 122 moves towards the outer side of the optical disk 110.

The position of the carriage 114 is detected by a carriage position sensor 132. An output carriage position signal E2 of the carriage position sensor 132 is output via an AGC amplifier 135 as a signal voltage which becomes 0 when the carriage 114 is positioned at an innermost position relative to the optical disk 110 and increases proportionally to the moving quantity of the carriage 114 as the carriage 114 moves towards the outer side relative to the optical disk 110.

The stationary optical head part 120 has a laser light receiving part 130 which receives the reflected light of the beam spot which is imaged on the optical disk 110 by the objective lens 122. A light reception signal output from the laser light receiving part 130 is supplied to an AGC amplifier 154, and the AGC amplifier 154 outputs a focus error signal E5 and a tracking error signal E6. Of course, the stationary optical head part 120 has a laser light source which emits a laser beam to the movable optical head part 118. The focus error signal E5 is supplied to a focus servo part 158 via an analog-to-digital converter (ADC) 156. An instruction data signal E11 output from the focus servo part 158 is supplied to the focus actuator driving coil 126 via a pulse width modulation (PWM) circuit 204 and a driving circuit 210.

A digital signal processor (DSP) 140 is provided to control the carriage 114, the lens actuator driving coil 124 and the focus actuator driving coil 126. The DSP 140 is provided with built-in ADC and digital-to-analog converter (DAC), and for example, a DSP model MB86311 manufactured by Fujitsu Limited of Japan may be used as this DSP 140. A processor circuit part 142 of the DSP 140 realizes various circuit functions of a carriage servo part 150, a focus servo part 158, a tracking servo part 164, and a controller 159 which controls controllers 150, 158 and 164. The processor circuit part 142 may also realize various circuit functions of a seek controller 172. In addition, a microprocessor unit (MPU) 220 notifies various commands such as a seek command and a measure command which will be described later to the DSP 140 based on commands which are received from an external disk control unit such as the host unit.

The carriage servo part 150 carries out double servo and position lock control using the carriage 114. In order to carry out such control, the carriage position signal E2 which is based on the output detection signal of the carriage position sensor 132 is output from the AGC amplifier 135, and is supplied to the carriage servo part 150 via an ADC 138. Further, a carriage speed signal E3 is formed in a differentiating circuit 134 by differentiating the carriage position signal E2 which is received via the AGC amplifier 135, and this carriage speed signal E3 is supplied to the carriage servo part 150 via an ADC 136.

The seek control of the seek controller 172 can be generally be divided into a coarse control and a fine control. The coarse control includes acceleration control, constant velocity control and deceleration control with respect to the carriage 114. On the other hand, the fine control controls the positioning of the carriage 14 to a target track position. According to the acceleration control of the coarse control, a predetermined acceleration current instruction data is output as an instruction data signal E10 from the seek controller 172 via the carriage servo part 150, and a constant acceleration current is applied to the carriage driving coil 116 via a PWM circuit 206 and a driving circuit 212 until a target velocity is reached.

When the acceleration control ends, the constant velocity control is carried out. According to the constant velocity control, a feedback control is carried out wherein a tracking error signal (TES) zero-crossing signal E7 output from a comparator 168 is counted in a counter 171 for a predetermined time, a counted value is compared with a target velocity in the seek controller 172, and the current instruction data E10 is output to the PWM circuit 206 so that a difference between the counted value and the target velocity becomes zero.

The deceleration control is carried out when the carriage 114 approaches a position which is a predetermined number of tracks (hereinafter simply referred to as a number of remaining tracks) from the target track. According to the deceleration control, the TES zero-crossing signal E7 output from the comparator 168 is counted in the counter 171 for a predetermined time, the counted value is compared with the target velocity of the seek controller 172, and the deceleration is controlled depending on the number of remaining tracks to the target track so as to follow the target velocity which decreases linearly, similarly to the constant velocity control. When the carriage 114 is moved by the carriage servo part 150 and the beam spot approaches the target track, the final positioning of the beam spot is made by the lens actuator 125.

For example, when the number of remaining tracks to the target track is 32 tracks, the seek control is also carried out at the same time by driving the objective lens 122 by the lens actuator driving coil 124. In other words, when the beam spot is moved by the driving of the carriage 114 and approaches the target track, the seek control positions the beam spot to the target track by driving the objective lens 122 by the lens actuator driving coil 124.

The tracking servo part 164 carries out an on-track control by driving the lens actuator driving coil 124 and outputs a seek current. The seek which is primarily made by the lens actuator 125 occurs when the number of tracks to the target cylinder is within 32 tracks towards the inner side of the outer side of the optical disk 110. In this state, the carriage servo part 150 carries out a position servo control. For this reason, the carriage servo part 150 carries out a position control so that the carriage 114 follows the movement of the lens actuator 125 and the carriage position signal E2 from the lens position sensor 128 constantly becomes zero.

A tracking error signal E6 which is based on the output light reception signal of the laser light receiving part 130 is supplied to the ADC 157 from the AGC amplifier 154, and is supplied to the tracking servo part 164. In addition, the tracking error signal E6 is supplied to the comparator 168 which outputs the TES zero-crossing signal E7 that indicates the zero-crossing timing of the tracking error signal E6. The TES zero-crossing signal E7 is supplied to the counter 171, and since one TES zero-crossing signal E7 is counted in the counter 171 every time one track is passed, it is possible to recognize in the seek controller 172 the number of tracks passed during the seek control. The number of tracks passed is the number of tracks traversed by the beam spot.

In addition, it is possible to recognize one track passing time in the seek controller 172 by measuring the generation period of the TES zero-crossing signal E7 output from the comparator 168 in a timer 170. When the one track passing time is obtained in the timer 170, the seek controller 172 can recognize the moving velocity of the beam spot at that time, that is, the moving velocity of the beam spot determined by the objective lens 122 which is driven by the lens actuator driving coil 124.

A seek command which instructs a target track address (target address) is notified from the host unit to the seek controller 172. The seek controller 172 which receives the seek command obtains the number of remaining tracks to the target track address from the present track address which is recognized based on the TES zero-crossing signal E7. The seek controller 172 carries out a seek control primarily using the lens actuator 125 if the number of remaining tracks is within 32 tracks, and carries out a seek control primarily using the carriage 114 if the number of remaining tracks is greater than 32 tracks.

In addition, the seek controller 172 stops the output of a track servo ON signal E8 at the same time as instructing a track jump current output, and turns OFF an on-track control by the tracking servo part 164.

During the time in which the tracking servo part 164 receives the track servo ON signal E8 from the seek controller 172, the tracking servo part 164 outputs an instruction data signal E12 to a PWM circuit 202 so that the tracking error signal E6 supplied to an ADC 162 constantly becomes zero. The instruction data signal E12 is supplied to the lens actuator driving coil 124 via a driving circuit 208, and an on-track control is carried out by driving the lens actuator 125 by the lens actuator driving coil 124.

When making the seek operation, the on-track control is cancelled by stopping the track servo ON signal E8, and the seek operation is carried out based on the track jump current output instruction which is output at the same time. The seek control primarily using the lens actuator 125 can generally be divided into a coarse control and a fine control, similarly to the seek control primarily using the carriage 114. The coarse control of the seek control primarily using the lens actuator 125 also includes acceleration control, constant velocity control and deceleration control.

A temperature sensor 133 is provided in the stationary optical head part 120, and an output detection signal of this temperature sensor 133 is supplied to the focus servo part 158 via an ADC 157. In addition, a read only memory (ROM) 141 and a random access memory (RAM) 143 are also provided within the DSP 40.

Figure 4:
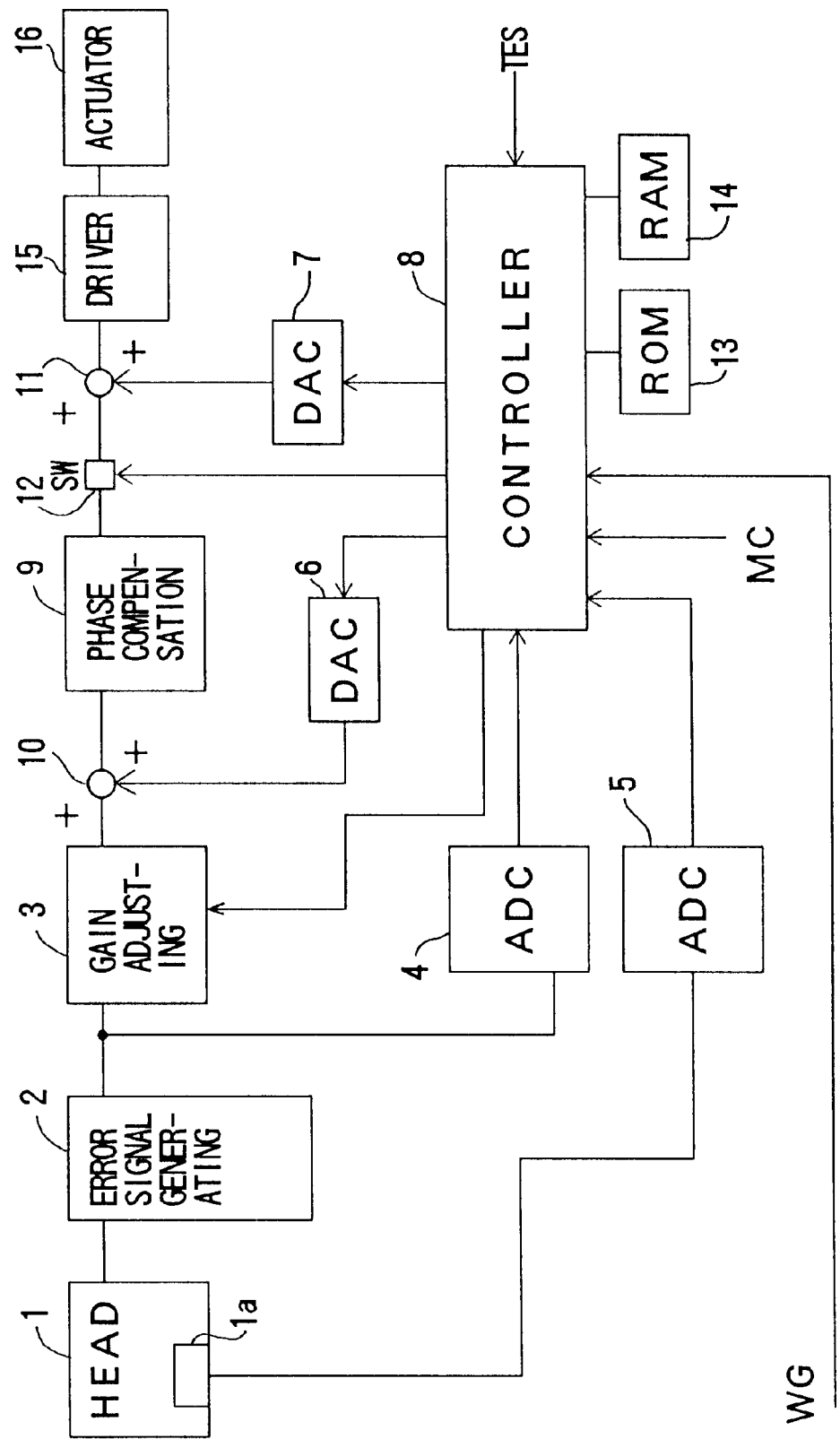
FIG. 4 is a system block diagram showing a part of the first embodiment of the optical disk unit.

FIG. 4 is a system block diagram showing a part of the first embodiment of the optical disk unit according to the present invention. The part of the optical disk unit shown in FIG. 4 includes an optical head 1, an error signal generating circuit 2, a gain adjusting circuit 3, ADCs 4 and 5, DACs 6 and 7, a controller 8, a phase compensation circuit 9, adders 10 and 11, a switch 12, a ROM 13, a RAM 14, a driver 15 and a focus actuator 16 which are connected as shown.

The optical head 1 shown in FIG. 4 corresponds to the stationary optical head part 120 shown in FIG. 3, and a temperature sensor 1a shown in FIG. 4 corresponds to the temperature sensor 133 shown in FIG. 3. The error signal generating circuit 2 corresponds to the AGC amplifier 154 shown in FIG. 3. A circuit part made up of the gain adjusting circuit 3, the ADCs 4 and 5, the DACs 6 and 7, the controller 8, the phase compensation circuit 9, the adders 10 and 11 and the switch 12 corresponds to the DSP 140 shown in FIG. 3. The controller 8 corresponds to the processor circuit part 142 shown in FIG. 3, and the ROM 13 and the RAM 14 respectively correspond to the ROM 141 and the RAM 143 shown in FIG. 3. In addition, the driver 15 corresponds to the PWM circuit 204 and the driving circuit 210 shown in FIG. 3, and the focus actuator 16 corresponds to the focus actuator driving coil 126 shown in FIG. 3. The PWM circuit 204 may be provided within the DSP 140.

The signal reproduced from the optical disk (not shown) by the optical head 1 is supplied to the error signal generating circuit 2. This error signal generating circuit 2 includes an AGC circuit, and generates the focus error signal FES from the reproduced signal. The focus error signal FES is supplied to the gain adjusting circuit 3, and is also supplied to the controller 8 via the ADC 4. The gain of the gain adjusting circuit 3 is controlled by a control signal from the controller 8, and the inconsistency among the individual optical heads 1 is corrected. For example, the controller 8 is made of a microcomputer, and receives the temperature detection signal from the optical head 1 or the temperature sensor 1a which is provided in a vicinity of the optical head 1 via the ADC 5 and also the tracking error signal TES, a measure command MC and the write gate signal WG from the host unit (not shown). The write gate signal WG controls the light emission of the light source within the optical head 1 during the write/erase. In addition, the measure command MC instructs measurement of the amount of off-focus or the amount deviated from the in-focus state during the write/erase. The ROM 13 prestores programs of various processes to be carried out by the controller 8 and the like, and the RAM 14 stores various data and the like.

The adder 10 adds an output of the gain adjusting circuit 3 and an output (offset value) of the DAC 6, and supplies an added result to the phase compensation circuit 9. An output of the phase compensation circuit 9, which is subjected to a phase compensation process, is supplied to the adder 11 via the switch 12. The adder 11 adds the output of the phase compensation circuit 9 which is obtained via the switch 12 and an output of the DAC 7, and supplies an added result to the driver 15. The DAC 7 supplies to the adder 11 an output which is dependent on a specified value from the controller 8. An output of the driver 15 is supplied to the focus actuator 16, and the optical system (objective lens and the like) of the optical head 1 is controlled so that the spot of the light beam emitted from the light source of the optical head 1 is formed at a desired position on the optical disk.

In the state where the focus servo is ON, the switch 12 is closed in response to the control signal from the controller 8. Hence the output of the phase compensation circuit 9 is supplied to the adder 11, thereby forming a focus servo loop. In this state where the focus servo is ON, the DAC 7 is controlled by the controller 8 so as not to generate an output. Accordingly, when the focus servo is ON, the output of the adder 10 is supplied to the driver 15 via the phase compensation circuit 9, the switch 12 and the adder 11.

On the other hand, in the state where the focus servo is OFF, the switch 12 is open in response to the control signal from the controller 8, and no focus servo loop is formed. In addition, only the output of the DAC 7 is supplied to the adder 11. Hence, in this state where the focus servo is OFF, the controller 8 controls the focus actuator 16 so as to swing the focus actuator 16 or the optical system.

Therefore, the output of the DAC 7 is supplied to the driver 15 when the focus servo is OFF, and the size of the beam spot formed on the optical disk is controlled by the operation of the focus actuator 16. Further, the controller 8 detects the in-focus position based on the output of the optical head 1.

When the controller 8 receives the measure command MC from the host unit corresponding to the MPU 220 shown in FIG. 3, the controller 8 starts a measuring process to measure the amount of off-focus or the amount deviated from the in-focus state during the write/erase. In this case, the MPU 220 issues the measure command MC with respect to the controller 8, that is, the DSP 140 shown in FIG. 3, when the power is turned ON and when waiting for a command by making a time supervision using a timer. First, the controller 8 makes a tracking servo system (not shown) of the optical disk unit inactive in response to the measure command MC, and monitors the tracking error signal TES while changing the specified value that is supplied to the DAC 6. In addition, the controller 8 stores in the RAM 14 the specified value (hereinafter also referred to as a first focus offset value) which is supplied to the DAC 6 when the tracking error signal TES is a maximum. When carrying out the measuring process, the controller 8 controls the switch 12 to close.

The tracking servo system may be that generally shown in FIG. 3 or a known tracking servo system. Illustration and detailed description of the tracking servo system itself will be omitted in this specification, because the tracking servo system itself is not directly related to the subject matter of the present invention. In addition, the method of detecting the maximum amplitude of the tracking error signal TES is known from Japanese Laid-Open Patent Applications No.62-128027, No.62-141644, No.62-222438 and No.2-230516, for example, and a description thereof will also be omitted.

Next, the controller 8 reads from the RAM 14 the specified value (first focus offset value) which is supplied to the DAC 6 when the tracking error signal TES becomes the maximum, and monitors the focus error signal FES which is obtained via the ADC 4 a predetermined number of times while supplying the read specified value to the DAC 6. The controller 8 stores an average value of the monitored focus error signals FES into a first region of the RAM 14. Furthermore, the controller 8 initializes a second region of the RAM 14 by setting "0" in the second region, for example. Then, the controller 8 starts emission of light from the light source within the optical head 1 to be used for the write/erase by a known method.

The controller 8 starts monitoring the value of the focus error signal FES which is obtained via the ADC 4 immediately after the light emission from the light source within the optical head 1 is started to be used for the read, and switches the operation mode by changing the light emission power of the light source from that for the read to that for the write/erase. The controller 8 accumulates the value of the focus error signal FES at the instant when the light emission power of the light source is changed to that for the write/erase to the value stored in the second region of the RAM 14, and restores the accumulated value into the second region. In addition, the controller 8 switches the operation mode by changing the light emission power of the light source again from that for the write/erase to that for the read, and then waits for a time until the value of the focus error signal FES stabilizes. The loop operation in which the value of the focus error signal FES at the instant when the light emission power of the light source within the optical head 1 is changed to that for the write/erase is accumulated to the value stored in the second region of the RAM 14 and the controller 8 waits until the value of the focus error signal FES stabilizes after the light emission power of the light source is changed again to that for the read, is performed a predetermined number of times. Then, the controller 8 divides the accumulated value which is read from the second region of the RAM 14 by the above predetermined number, and averages the amount of deviation of the focus error signal FES at the time when the light emission power of the light source is switched from that for the read to that for the write/erase. Furthermore, the controller 8 subtracts the value stored in the first region of the RAM 14 from the value stored in the second region of the RAM 14 to obtain a second focus offset value. The controller 8 updates the second focus offset value by storing this second focus offset value in the second region of the RAM 14.

The above described measuring process may be carried out once at the time when the optical disk unit is adjusted. Alternatively, the measuring process may be carried out every time the power of the optical disk unit is turned ON or every time the optical disk is changed. Furthermore, it is possible to carry out the measuring process at predetermined time intervals.

Figure 5:
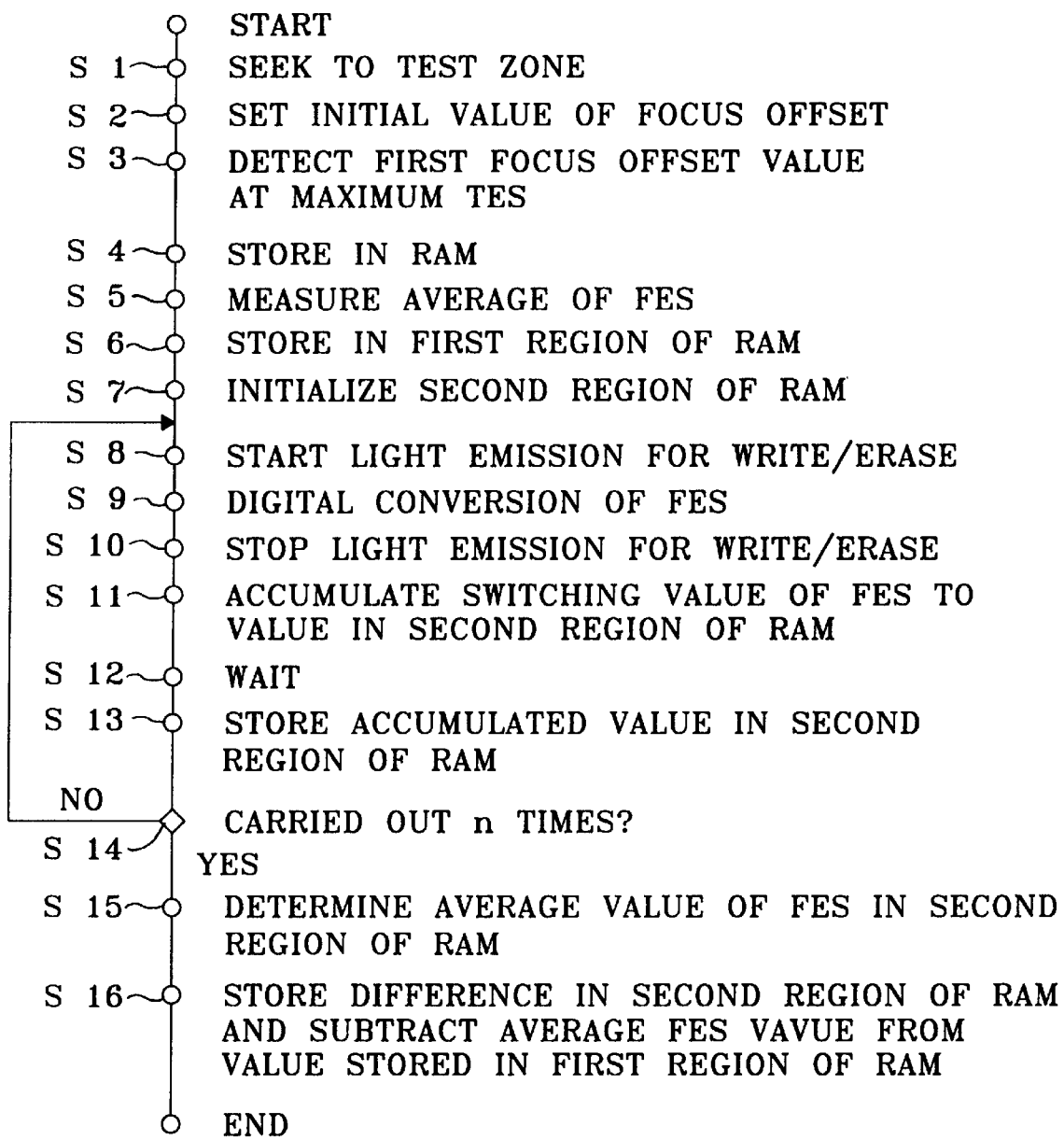
FIG. 5 is a flow chart for explaining a measuring process of a controller.

FIG. 5 is a flow chart for explaining the measuring process of the controller 8. In FIG. 5, a step S1 controls a tracking servo system and a carriage servo system (not shown) which controls a carriage (not shown) that moves the optical head 1, so as to carry out the seek operation to a test zone on the optical disk. The carriage, the carriage servo system and the tracking servo system themselves may be those shown in FIG. 3 or any known carriage, carriage servo system and tracking servo system. Hence, illustration and description of the carriage, the carriage servo system and the tracking servo system will be omitted.

A step S2 supplies an initial value of the focus offset value to the DAC 6. In this case, the initial value of the focus offset value is 0. In other words, during the write/erase, the focus offset value is set to a reference value which is 0. A step S3 detects the first focus offset value at the time when the tracking error signal TES becomes a maximum, and a step S4 stores the detected first focus offset value in the RAM and also supplies the first focus offset value to the DAC 6. A step S5 monitors the focus error signal FES a predetermined number of times and obtains an average value of the focus error signal FES. A step S6 stores the average value of the focus error signal FES in the first region of the RAM 14, and a step S7 initializes the second region of the RAM 14.

In other words, the first focus offset value is designed so that the zero-crossing point of the focus error signal FES matches the point where the tracking error signal TES becomes the maximum amplitude when the focus servo is ON, however, these points do not match in the actual optical disk unit due to assembling or mounting errors, adjustment errors and the like. Accordingly, the steps S2 through S6 are carried out to measure the first focus offset value which is used when correcting the error between the zero-crossing point of the focus error signal FES and the point where the tracking error signal TES becomes the maximum amplitude.

In the above case, the focus offset value during the write/erase is used as the reference, but it is of course possible to use the focus offset value during the read as the reference.

A step S8 starts the light emission of the light source within the optical head 1 for the write/erase in response to the write gate signal WG when the write gate signal WG is asserted. A step S9 monitors the focus error signal FES which is obtained via the ADC 4. A step S10 changes the light emission power of the light source from that for the write/erase to that for the read, and stops the write/erase operation by negating the write gate signal WG. A step S11 accumulates the value of the focus error signal FES which deviates at the instant when the light emission power of the light source is changed from that for the write/erase to that for the read to the value which is stored in the second region of the RAM 14. A step S12 waits from the time when the light emission power of the light source is changed to that for the read until the value of the focus error signal FES stabilizes. In addition, a step S13 stores the value accumulated in the step S11 into the second region of the RAM 14.

A step S14 decides whether or not the processes of the steps S8 through S13 are carried out n times, and the process returns to the step S8 if the decision result is NO. On the other hand, if the decision result in the step S14 is YES, a step S15 divides the accumulated value stored in the second region of the RAM 14 by n, so as to average the amount of deviation of the focus error signal FES caused by the switching of the light emission power of the light source. Furthermore, a step S16 subtracts the value stored in the first region of the RAM 14 from the value stored in the second region, and stores the difference into the second region as the second focus offset value. The second focus offset value is obtained to correct the focus error caused by the change in the waveform that occurs when the light emission power of the light source is switched.

In the above case, the amount of deviation of the focus error signal FES is measured when the light emission power of the light source is changed from that for the write/erase to that for the read. However, it is of course possible to measure the amount of deviation of the focus error signal FES when the light emission power of the light source is changed from that for the read to that for the write/erase.

In addition, it is possible to measure in advance the amount of focus error that occurs depending on the change in the operating environment of the optical disk unit. In this case, the amount of focus error dependent on the operating environment is corrected based on the measured value.

In other words, it is possible to measure in advance the focus error at various temperatures, for example, and store a table which indicates the relationship between the temperature and the focus error in the RAM 14 shown in FIG. 4. In this case, the controller 8 monitors the temperature detection signal from the temperature sensor 1a via the ADC 5 at an arbitrary timing, and reads the amount of focus error corresponding to the temperature which is indicated by the temperature detection signal from the table stored in the RAM 14. In addition, the controller 8 obtains a third focus offset value for correcting the focus error which is read from the table, and supplies this third focus offset value to the DAC 6. The arbitrary timing at which the controller monitors the temperature detection signal may be the time when the power of the optical disk unit is turned ON, the time when the optical disk is loaded into the optical disk unit, predetermined time intervals or the like. When monitoring the temperature detection signal at predetermined time intervals, it is possible to set the predetermined time to approximately 10 minutes by using a timer, for example, or by monitoring the temperature detection signal every time the optical disk makes one revolution, for example.

Moreover, the third focus offset value which is used for correcting the focus error depending on the temperature may be obtained in advance and stored in the RAM 14 in the form of a table which indicates the relationship between the temperature and the third focus offset value that corrects the focus error. In this case, the controller 8 monitors the temperature detection signal from the temperature sensor 1a via the ADC 5 at an arbitrary timing, reads the third focus offset value corresponding to the temperature indicated by the temperature detection signal from the table stored in the RAM 14, and supplies the read third focus offset value to the DAC 6.

Furthermore, the table that is stored in the RAM 14 may indicate the relationship between the temperature and the average value of the amount of focus error or the average value of the third focus offset value, which average values are obtained based on the amount of focus error measured with respect to each individual optical disk unit. In this case, it is possible to satisfactorily absorb the inconsistency among the characteristics of the individual optical disk units.

Next, a description will be given of a correction process which is carried out with respect to the focus error based on the measured result described above.

Figure 6:
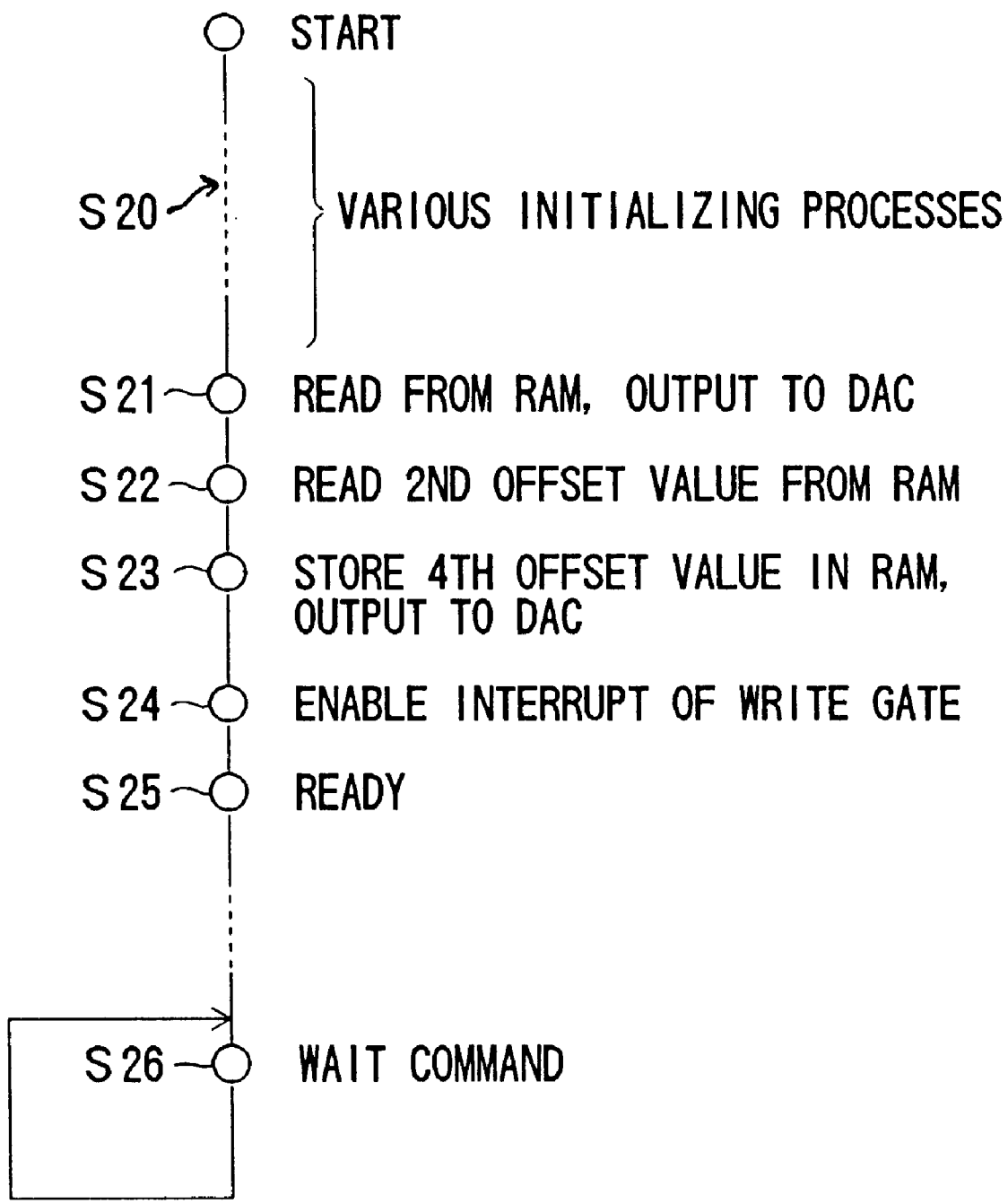
FIG. 6 is a flow chart for explaining a correction process with respect to a focus error.

FIG. 6 is a flow chart for explaining the correction process with respect to the focus error. This correction process corresponds to a first embodiment of a focus control method according to the present invention. For example, when the power of the optical disk unit is turned ON and the correction process is started in FIG. 6, step S20 carries out various initializing processes. The initializing processes include a process which closes the switch 12 and turns the focus servo ON, a process which reads from the RAM 14 the first focus offset value at the time when the tracking error signal TES becomes a maximum, a process which uses a table stored in the RAM 14 to obtain the third focus offset value corresponding to the temperature indicated by the temperature detection signal from the temperature sensor 1a, and the like.

A step S21 adds the first focus offset value and the third focus offset value which are read from the RAM 14, and stores the added focus offset value in the RAM 14 and also supplies the added focus offset value to the DAC 6. As described above, the first focus offset value is used to absorb the inconsistencies among the individual optical disk units, and the third focus offset value is used to correct the focus error with respect to the temperature. The third focus offset value is thereafter updated in correspondence with the temperature at each monitoring timing by monitoring the temperature detection signal from the temperature sensor 1a at arbitrary timings. However, it is of course possible not to update the third focus offset value.

A step S22 reads the second focus offset value for each operation mode from the RAM 14. A step S23 obtains a two's-complement of the read second focus offset value, and converts the value of the two's-complement into a negative value. In addition, the step S23 obtains a fourth focus offset value by adding this negative value to the added focus offset value which is obtained in the step S21. Furthermore, the step S23 stores the fourth focus offset value in the RAM 14 and also supplies this fourth focus offset value to the DAC 6.

A step S24 enables an interrupt by a rising/falling edge of the write gate signal WG after carrying out the step S23. A step S25 returns a ready signal to the host unit, and a step S26 puts the optical disk unit into a command wait (or standby) state.

Figure 7:
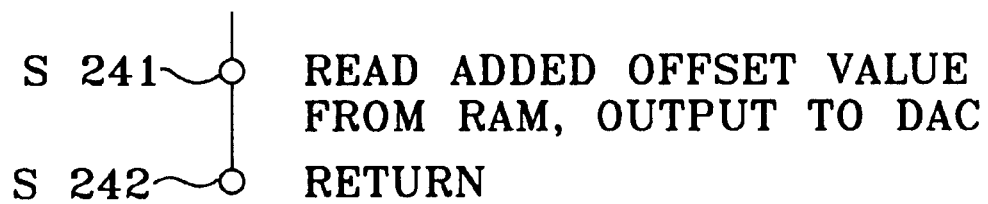
FIG. 7 is a flow chart for explaining an interrupt process of a write gate signal by a write/erase.
Figure 8:
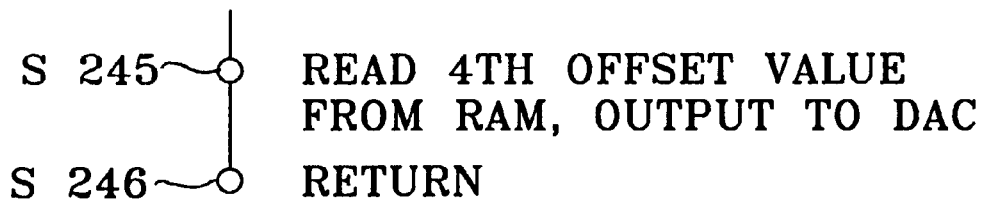
FIG. 8 is a flow chart for explaining an interrupt process of the write gate signal by the write/erase.

FIGS. 7 and 8 are flow charts for explaining an interrupt process of the write gate signal WG by the write/erase.

When the host unit receives a write/erase command, the host unit raises the level of the write gate signal WG with respect to the controller 8 at a target block. When the controller 8 detects the rising edge of the write gate signal WG in or after the step S24 shown in FIG. 6, a step S241 shown in FIG. 7 reads the added focus offset value from the RAM 14 and supplies this added focus offset value to the DAC 6. As described above, the added focus offset value is obtained by adding the first focus offset value and the third focus offset value. Then, a step S242 returns the process to the step S24 shown in FIG. 6, for example.

When the controller 8 detects the falling edge of the write gate signal WG in or after the step S24 shown in FIG. 6, a step S245 shown in FIG. 8 reads the fourth focus offset value from the RAM 14, and supplies this fourth focus offset value to the DAC 6. Then, a step S246 returns the process to the step S24 shown in FIG. 6, for example.

As described above, the RAM 14 may independently store the first, second and third focus offset values or store the focus offset values for the read and the write/erase.

Figure 9:
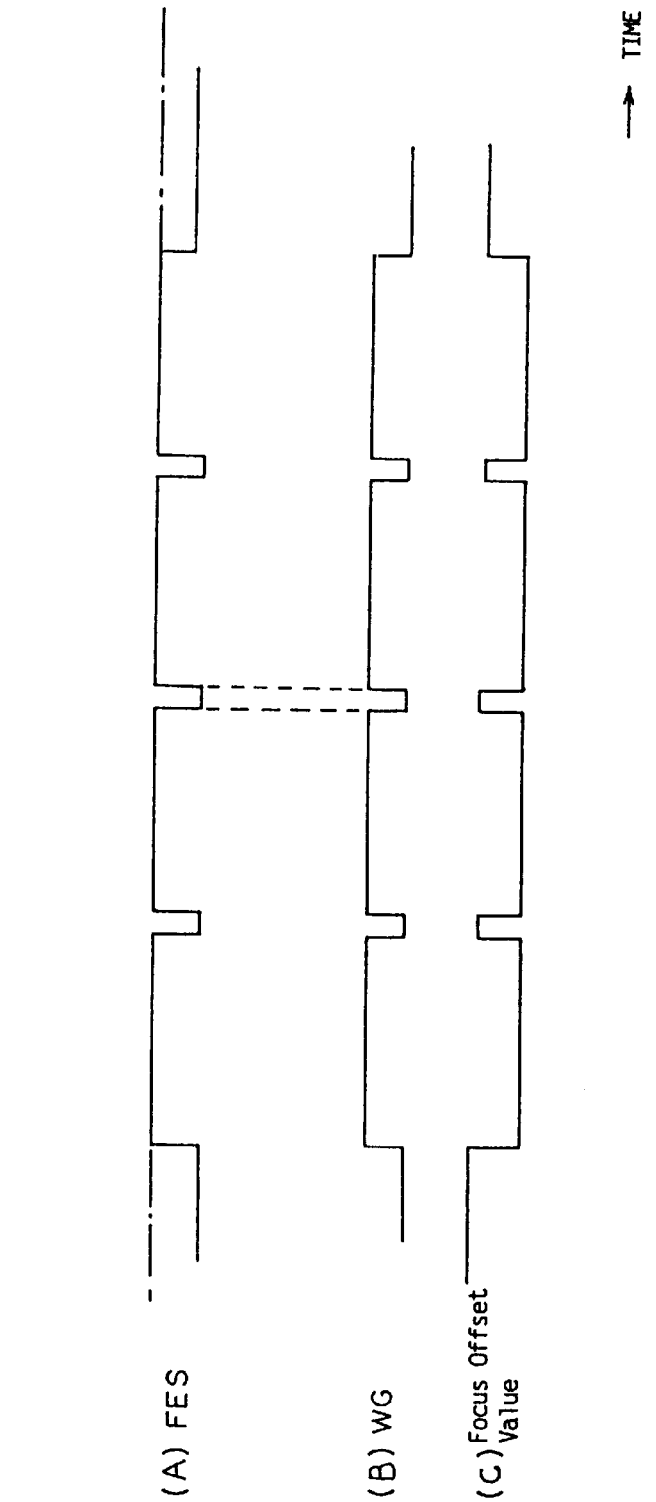
FIG. 9(including subparts A–C) is a timing chart for explaining the relationship of a focus error signal, the write gate signal and a focus offset value which are obtained in the first embodiment.

FIGS. 9(A) through 9(C) are timing charts for explaining the relationship of the focus error signal FES, the write gate signal WG and the focus offset value which are obtained in this embodiment. FIG. 9(A) shows the focus error signal FES, FIG. 9(B) shows the write gate signal WG, and FIG. 9(C) shows the focus offset value. During the low-level period of the write gate signal WG, that is, during the time when the light source of the optical head 1 emits the light which is used for the read, a focus offset occurs by an amount corresponding to the deviation caused by the write/erase. However, during the read, a relatively large margin exists with respect to the focus error when compared to the write/erase, and the focus offset corresponding to the amount of the deviation caused by the write/erase falls within a tolerable range. On the other hand, during the high-level period of the write gate signal WG, that is, during the time when the light source of the optical head 1 emits the light which is used for the write/erase, the focus servo is carried out so as to follow the optimum in-focus position.

Figure 10:
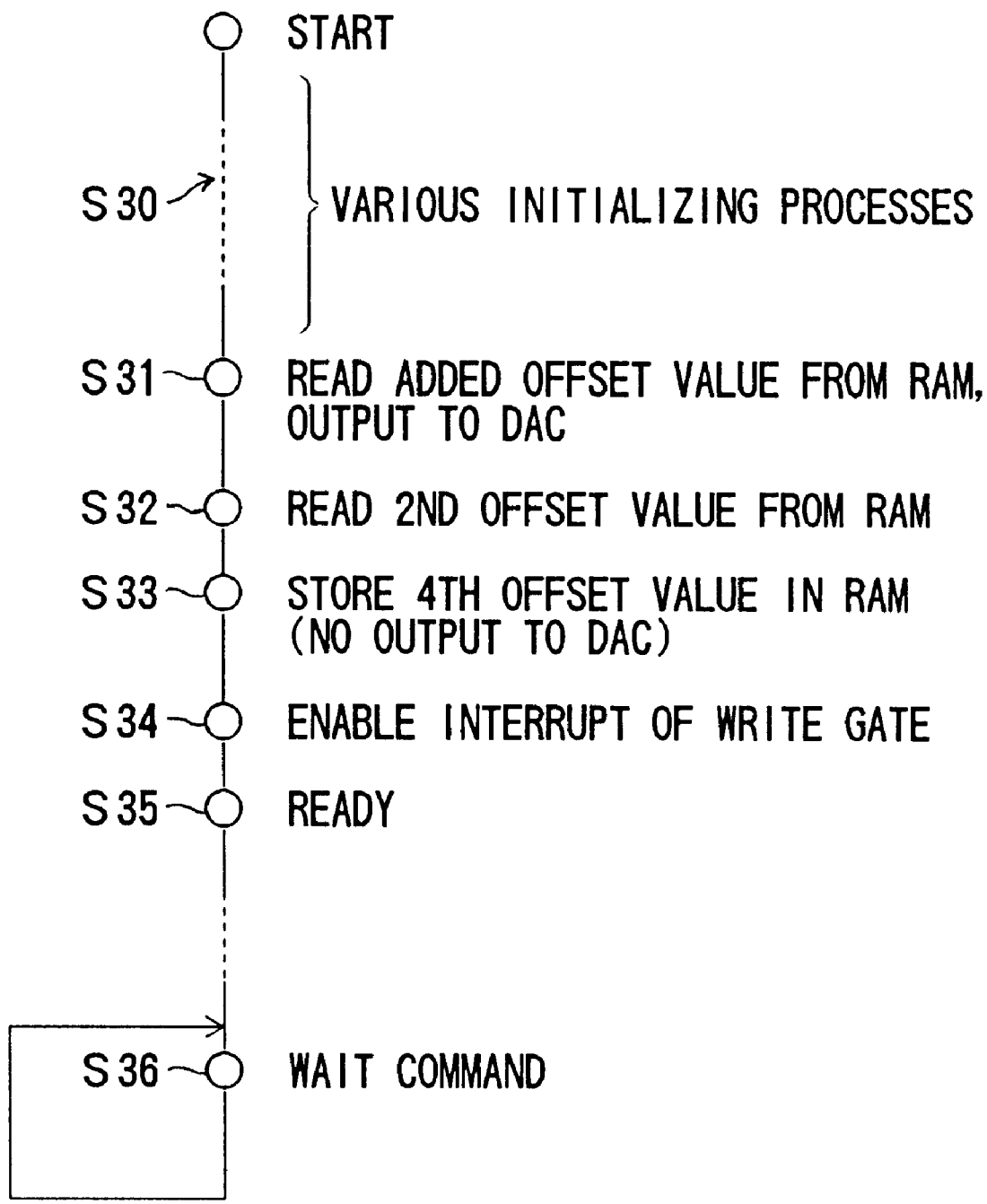
FIG. 10 is a flow chart for explaining a correction process with respect to the focus error in a second embodiment of the optical disk unit according to the present invention.
Figure 11:
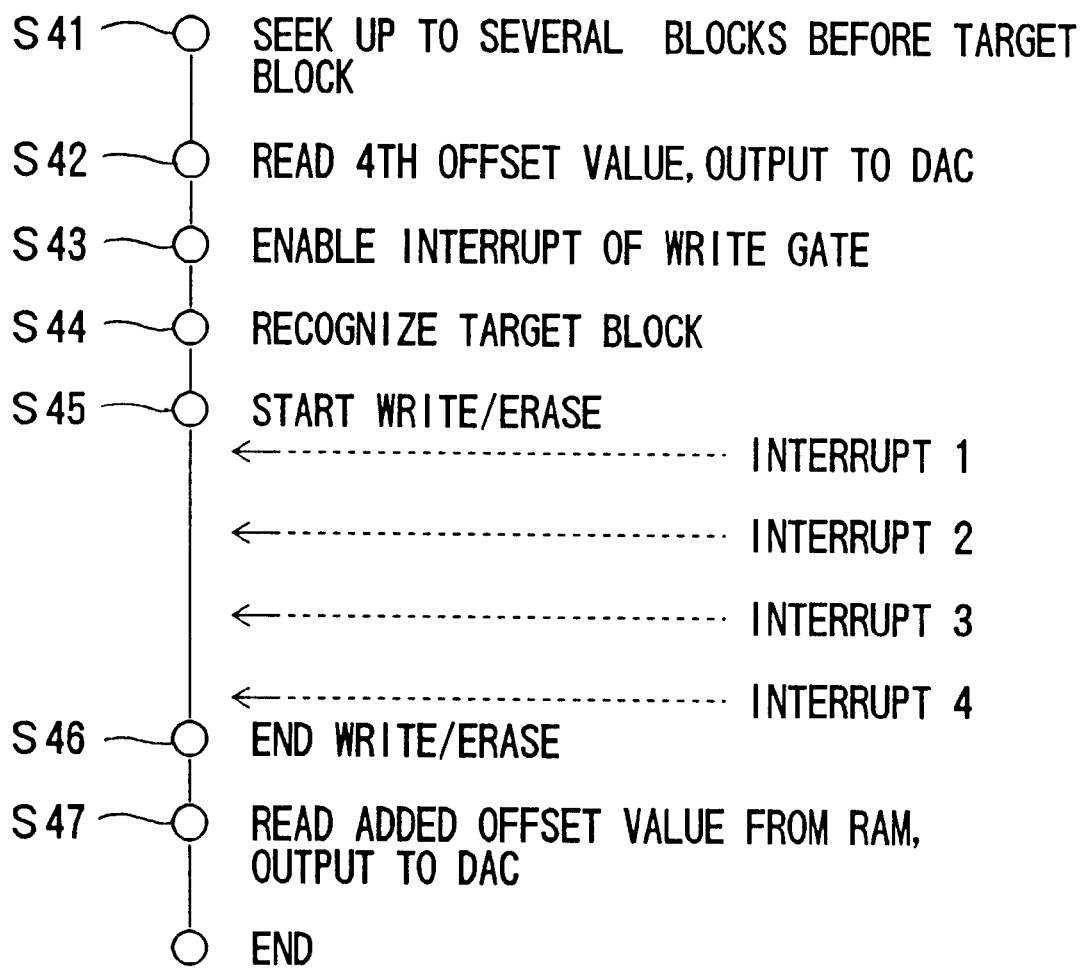
FIG. 11 is a flow chart for explaining a process that is carried out when a controller receives a write/erase command from a host unit in a command wait state in a step S36 shown in FIG. 10.

Next, a description will be given of a second embodiment of the optical disk unit according to the present invention, by referring to FIGS. 10 and 11. In this second embodiment, the optical disk unit is constructed similarly to the first embodiment shown in FIG. 4, and illustration thereof will be omitted. FIGS. 10 and 11 are flow charts for explaining a correction process which is carried out with respect to the focus error in this second embodiment. This correction process corresponds to a second embodiment of the focus control method according to the present invention. The learning of the focus offset value may be made by a measuring process similar to that of the first embodiment described above.

In FIG. 10, when the correction process is started by turning ON the power of the optical disk unit, for example, a step S30 carries out various initializing processes. These initializing processes include a process which closes the switch 12 and turns the focus servo ON, a process which reads from the RAM 14 the first focus offset value at the time when the tracking error signal TES becomes a maximum, a process which uses a table stored in the RAM 14 to obtain the third focus offset value corresponding to the temperature indicated by the temperature detection signal from the temperature sensor 1a, and the like.

A step S31 adds the first focus offset value and the third focus offset value which are read from the RAM 14, and stores the added focus offset value in the RAM 14 and also supplies the added focus offset value to the DAC 6. The third focus offset value is thereafter updated in correspondence with the temperature at each monitoring timing by monitoring the temperature detection signal from the temperature sensor 1a at arbitrary timings.

A step S32 reads the second focus offset value from the second region of the RAM 14. A step S33 obtains a two's-complement of the read second focus offset value, and converts the value of the two's-complement into a negative value. In addition, the step S33 obtains a fourth focus offset value by adding this negative value to the added focus offset value which is obtained in the step S31. Furthermore, the step S33 stores the fourth focus offset value in the RAM 14 but does not supply this fourth focus offset value to the DAC 6.

A step S34 enables an interrupt by a rising/falling edge of the write gate signal WG. A step S35 returns a ready signal to the host unit, and a step S36 puts the optical disk unit into a command wait (or standby) state.

A description will now be given of a process which is carried out when the controller 8 receives the write/erase command from the host unit in the command wait (standby) state in the step S36 shown in FIG. 10, by referring to the flow chart of FIG. 11.

In FIG. 11, when the write/erase command is received in the command wait (standby) state, a step S41 carries out a seek operation up to a position which is several blocks before a target position. A step S42 reads the fourth focus offset value from the RAM 14 and supplies the fourth focus offset value to the DAC 6. For example, the seek operation up to the position which is several blocks before the target position may be made by obtaining a number of seek tracks from a difference between the target track and the present track, counting the number of traversed tracks which are traversed by the beam spot, obtaining the moving velocity of the beam spot from the number of traversed tracks, and carrying out a velocity control with resect to the actual position on the optical disk while beam spot traverses the tracks. In addition, after the target track is reached, the tracking servo loop is closed and the seek operation is ended.

A step S43 enables the interrupt by the rising/falling edge of the write gate signal WG. The interrupt process of the write gate signal WG is the same as that of the first embodiment described above. A step S44 recognizes a target block. A step S45 starts the write/erase operation. After the write/erase operation is carried out by the interrupt, a step S46 ends the write/erase operation. A step S47 reads from the RAM 14 the added focus offset value which is obtained by adding the first focus offset value and the third focus offset value. In addition, the step S47 supplies the read added focus offset value to the DAC 6, and the process ends.

According to this embodiment, it is possible to reduce the time in which the focus servo is made to a position other than the optimum in-focus position, that is, reduce the focus pull-in time. Moreover, it is possible to carry out the focus servo to the optimum in-focus position also during the time in which the light source of the optical head 1 makes the light emission for the read.

Figure 12:
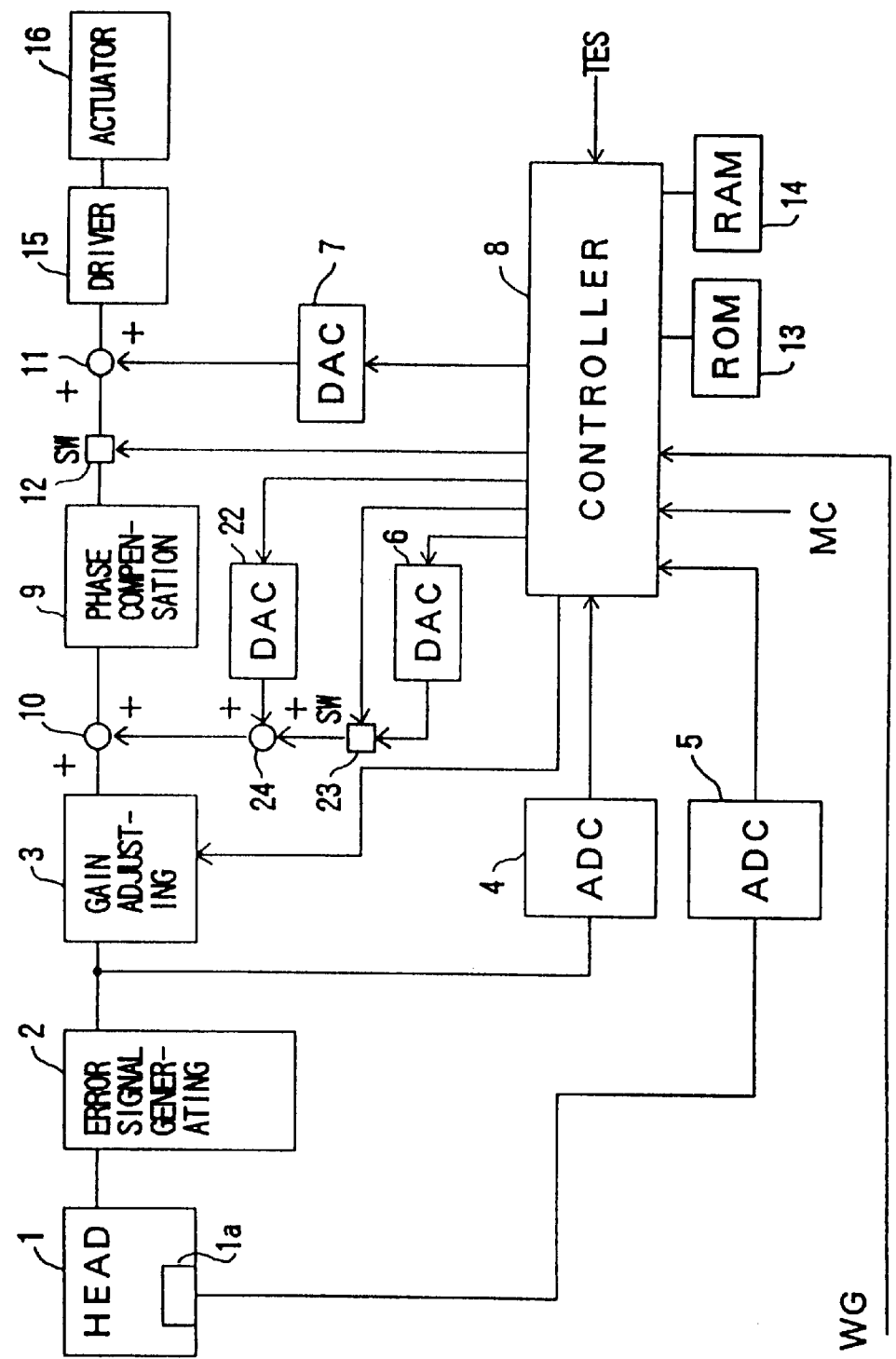
FIG. 12 is a system block diagram showing a part of a third embodiment of the optical disk unit according to the present invention.
Figure 13:
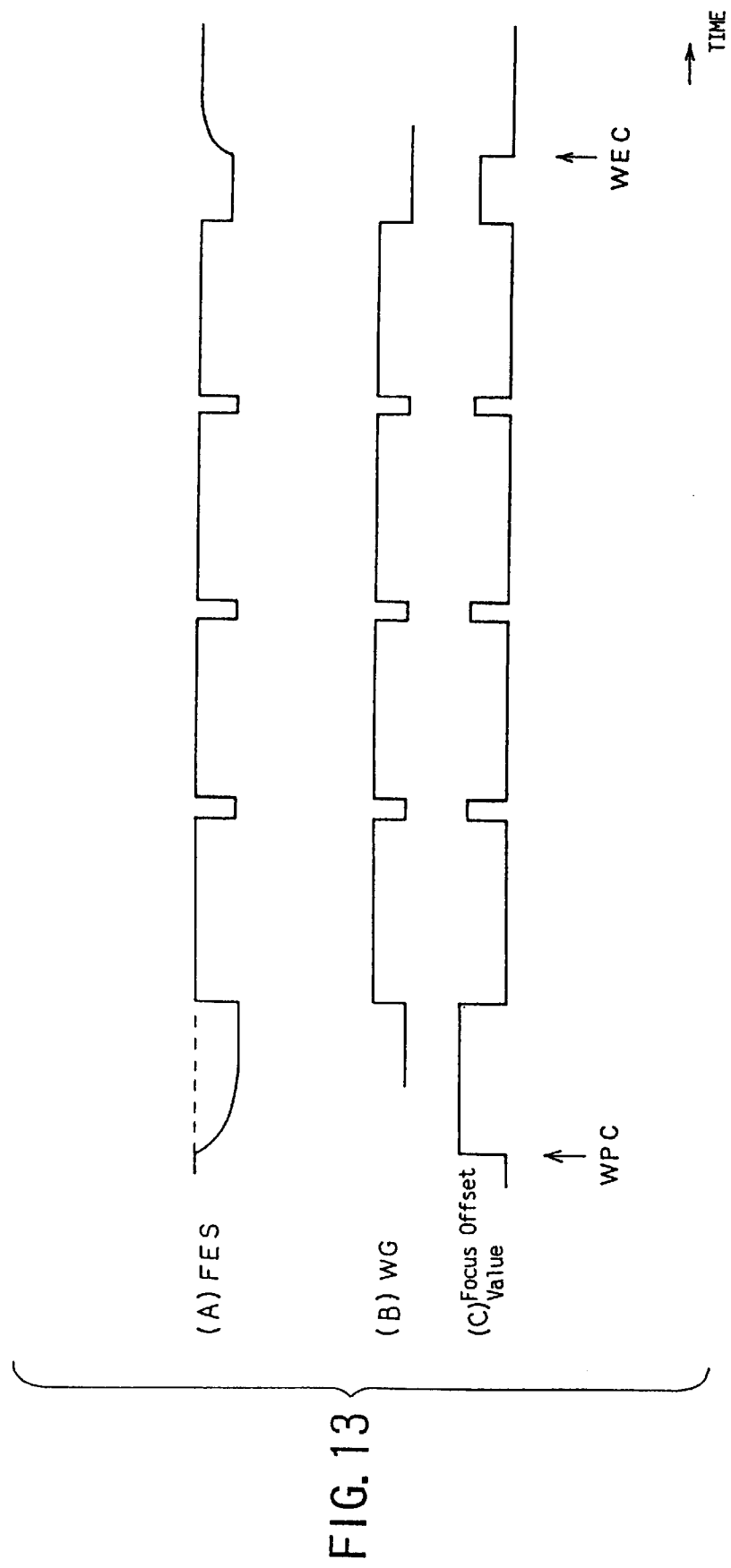
FIG. 13(including subparts A–C) is a timing chart for explaining the relationship of a focus error signal, a write gate signal and a focus offset value which are obtained in the third embodiment.

Next, a description will be given of a third embodiment of the optical disk according to the present invention, by referring to FIGS. 12 and 13. FIG. 12 is a system block diagram showing the third embodiment, and FIGS. 13(A) through 13(C) are timing charts for explaining the relationship of the focus error signal FES, the write gate signal WG and the focus offset value which are obtained in the third embodiment. In FIG. 12, those parts which are the same as those corresponding parts in FIG. 4 are designated by the same reference numerals, and a description thereof will be omitted.

As shown in FIG. 12, this embodiment of the optical disk unit additionally includes a DAC 22, a switch 23 and an adder 24. The output of the DAC 6 is supplied to the adder 24 via the switch 23 which is controlled by the controller 8. In addition, An output of the DAC 22 is supplied to the adder 24. An output of this adder 24 is supplied to the adder 10. A portion of the interrupt processes of the first and second embodiments described above can be realized by controlling the switch 23.

The DAC 6 is connected to the focus servo loop when the switch 23 is closed. The controller 8 controls the switch 23 so that the switch 23 is open during the high-level period of the write gate signal WG and the switch 23 is closed during the low-level period of the write gate signal WG. In addition, the controller 8 obtains the two's-complement of the second focus offset value which is read from the RAM 14, converts the value of this two's-complement into a negative value, and supplies this negative value to the DAC 6. Furthermore, the controller 8 adds the first focus offset value which is read from the RAM 14 and the third focus offset value which is obtained, and supplies the added focus offset value to the DAC 22.

FIGS. 13(A) through 13(C) show the relationship of the focus error signal FES, the write gate signal WG and the focus offset value which are obtained in this embodiment. FIG. 13(A) shows the focus error signal FES, FIG. 13(B) shows the write gate signal WG, and FIG. 13(C) shows the focus offset value. During the low-level period of the write gate signal WG, that is, during the time when the light source of the optical head 1 emits the light which is used for the read, a focus offset occurs by an amount corresponding to the deviation caused by the write/erase. However, during the read, a relatively large margin exists with respect to the focus error when compared to the write/erase, and the focus offset corresponding to the amount of the deviation caused by the write/erase falls within a tolerable range. On the other hand, during the high-level period of the write gate signal WG, that is, during the time when the light source of the optical head 1 emits the light which is used for the write/erase, the focus servo is carried out so as to follow the optimum in-focus position. FIG. 13(C) also shows an issue timing of a write/erase preparation command WPC which is supplied from the host unit to the controller 8 in order to instruct preparations for the write/erase before a write/erase command is issued, and an issue timing of a write/erase end command WEC which instructs the end of the write/erase.

In each of the embodiments described above, it was assumed for the sake of convenience that the light emission power of the light source is switched between 2 levels, that is, switched between the light emission power for the read and the light emission power for the write/erase. However, the light source may have more than 3 levels of light emission power, and the present invention is also similarly applicable in such cases. For example, in addition to the 2 levels of light emission power for the read and the write/erase, another assist level of light emission power may be provided so that the light source makes the light emission at the assist level in a state other than the read and the write/erase. Furthermore, 2 levels may be provided for the light emission power of the light source for the write/erase.

In addition, in each of the embodiments described above, the focus offset value is read from a memory for the sake of convenience. However, the memory simply needs to store focus offset information that is necessary to obtain the focus offset value. For example, the focus offset information is a calculation formula for obtaining the focus offset value.

Further, the present invention is not limited to these embodiments, but various variations and modifications may be made without departing from the scope of the present invention.

What is claimed is:

1. A focus control method which controls a focus servo system for controlling a focus of a light irradiated on an optical disk in an optical disk unit which has a plurality of operation modes, said focus control method comprising the steps of:
   (a) reading focus offset information from a memory in relation to an operation mode selected, said memory storing plural focus offset information for correcting a focus error generated immediately after the operation mode is switched from one operation to another; and
   (b) controlling the focus with respect to the optical disk by supplying the focus offset information read in said step (a) to the focus servo system when the operation mode of the optical disk unit is switched from one operation mode to another.

2. The focus control method as claimed in claim 1, wherein said step (b) supplies the focus offset information to the focus servo system at a start of a write or erase mode of the optical disk unit and at an end of the write or erase mode.

3. The focus control method as claimed in claim 1, wherein said step (b) measures a tracking error signal which is supplied to a tracking servo system of the optical disk unit, and supplies to the focus servo system the focus offset information at a time when an amplitude of the tracking error signal becomes a maximum.

4. The focus control method as claimed in claim 1, wherein the focus error is measured when the power of the optical disk unit is turned on or when the optical disk is loaded into the optical disk unit.

5. The focus control method as claimed in claim 1, which further comprises the steps of:
   (c) obtaining the focus offset information at an arbitrary timing and storing the obtained focus offset information in the memory.

6. The focus control method as claimed in claim 5, wherein said step (c) obtains the focus offset information at a time when an amplitude of a tracking error signal which is supplied to a tracking servo system of the optical disk unit becomes a maximum and stores the obtained focus offset information in the memory.

7. The focus control method as claimed in claim 5, wherein said step (c) measures and stores the focus offset information in the memory at a start of a write or erase mode of the optical disk unit and at an end of the write or erase mode.

8. The focus control method as claimed in claim 5, wherein said step (c) measures a focus error under various operating environments of the optical disk unit, and stores in the memory a relationship of the operating environments and the focus error or the focus offset information which is used to correct the focus error.

9. The focus control method as claimed in claim 8, wherein said step (c) stores in the memory an average value of the focus offset information or an average value of the focus error dependent on the operating environments, which average values are obtained based on the focus error measured with respect to one or a plurality of optical disk units.

10. An optical disk unit comprising:
   a focus servo system controlling a focus of a light irradiated on an optical disk;
   a memory for storing plural focus offset information for correcting a focus error which is generated immediately after an operation mode of the optical disk unit is switched from one operation mode to another, wherein selected said focus offset information is associated with a selected one of plural operation modes; and a controller correcting a focus error with respect to the optical disk by supplying a focus offset value which is based on the focus offset information read from said memory to said focus servo system at a time when the operation mode of the optical disk unit is switched from the one operation mode to another.

11. The optical disk unit as claimed in claim 10, wherein the focus error is measured when the power of the optical disk unit is turned on or when the optical disk is loaded into the optical disk unit.

12. The optical disk unit as claimed in claim 10, wherein said controller supplies the focus offset value to said focus servo system at a start of a write or erase mode of the optical disk unit and at an end of the write or erase mode, said focus offset value being set to a reference value in the write and erase modes.

13. The optical disk unit as claimed in claim 10, which further comprises:
a tracking error signal detector detecting a tracking error signal based on a reflected light from the optical disk,
said controller supplying the focus offset value at a time when an amplitude of the tracking error signal becomes a maximum to said focus servo system at an arbitrary timing.

14. The optical disk unit as claimed in claim 10, which further comprises:
storing means for obtaining the focus offset value at an arbitrary timing and storing the obtained focus offset value in said memory.

15. The optical disk unit as claimed in claim 14, which further comprises:
a tracking error signal detector for detecting a tracking error signal based on a reflected light from the optical disk,
said storing storing in said memory means focus offset information at a time when an amplitude of the tracking error signal becomes a maximum.

16. The optical disk unit as claimed in claim 14, wherein said storing stores in said memory means focus offset information at a start of a write or erase mode of the optical disk unit and at an end of the write or erase mode.

17. The optical disk unit as claimed in claim 14, wherein said storing means measures a focus error under various operating environments of the optical disk unit and stores in said memory focus offset information for correcting a relationship of the operating environments and the focus error or the focus offset information which is used to correct the focus error.

18. The optical disk unit as claimed in claim 17, wherein said storing means stores in said memory an average value of the focus offset information or an average value of the focus error dependent on the operating environments, which average values are obtained based on the focus error measured with respect to one or a plurality of optical disk units.

19. A focus control method which controls a focus servo system for controlling a focus of a light irradiated on an optical disk in an optical disk unit which has a plurality of operation modes, said focus control method comprising the steps of:
(a) reading focus offset information from a memory which prestores focus offset information for correcting a focus error, wherein said focus offset information is read from said memory depending on an operation mode selected, wherein first focus offset information determined as an average read FES value is used during a read mode and second focus offset information determined as a difference between said average read FES value and an average switching FES value is used during a write mode; and
(b) controlling the focus with respect to the optical disk by supplying the focus offset information read in said step (a) to the focus servo system when the operation mode of the optical disk unit is switched from one mode to another.

20. The focus control method as claimed in claim 19, wherein said average switching FES value is determined by accumulating a focus error signal when the laser power is switched between a write mode and a read mode for a predetermined number of samples, and dividing said accumulated focus error signal by said predetermined number.

21. An optical disk unit comprising:
a focus servo system controlling a focus of a light irradiated on an optical disk;
a memory storing focus offset information for correcting a focus error, wherein said focus offset information depends on an operation mode selected, wherein first focus offset information determined as an average read FES value is used during a read mode and second focus offset information determined as a difference between said average read FES value and an average switching FES value is used during a write mode; and
a controller correcting a focus error with respect to the optical disk by supplying a focus offset value which is based on the focus offset information read from said memory to said focus servo system at a time when the operation mode of the optical disk unit is switched from one mode to another.

22. The focus control method as claimed in claim 21, wherein said average switching FES value is determined by accumulating a focus error signal when the laser power is switched between a write mode and a read mode for a predetermined number of samples, and dividing said accumulated focus error signal by said predetermined number.

23. A focus control method which controls a focus servo system for controlling a focus of a light irradiated on an optical disk in an optical disk unit which has a plurality of operation modes, said focus control method comprising the steps of:
(a) reading focus offset information from a memory in relation to an operation mode selected, said memory storing plural focus offset information for correcting a focus error generated immediately after the operation mode is switched from one operation mode to another;
(b) controlling the focus with respect to the optical disk by supplying the focus offset information read in said step (a) to the focus servo system when the operation mode of the optical disk unit is switched from the one operation mode to another; and
(c) detecting a temperature within the optical disk unit at an arbitrary timing,
said step (b) supplying to the focus servo system focus offset information corresponding to the temperature detected in said step (c).

24. The focus control method as claimed in claim 23, wherein said step (b) updates the focus offset information corresponding to the temperature which is detected in said step (c) at an arbitrary timing.

25. An optical disk unit comprising:
a focus system controlling a focus of a light irradiated on an optical disk;
a memory storing plural focus offset information for correcting a focus error which is generated immediately after an operation mode of the optical disk unit is switched from one operation mode to another, wherein selected said focus offset information is associated with a selected one of plural operation modes;

a controller correcting a focus error with respect to the optical disk by supplying a focus offset value which is based on the focus offset information read from said memory to said focus servo system at a time when the operation mode of the optical disk unit is switched from the one operation mode to another; and a detector detecting a temperature within the optical disk unit at an arbitrary timing, said controller supplying a focus offset value corresponding to the temperature detected by said detector to said focus servo system.

26. The optical disk unit as claimed in claim 25, wherein said controller updates the focus offset value corresponding to the temperature which is detected by said detector at an arbitrary timing.

* * * * *

UNITED STATES PATENT AND TRADEMARK OFFICE
CERTIFICATE OF CORRECTION

PATENT NO. : 5,970,032
DATED : October 19, 1999
INVENTOR(S) : Ikeda et al.

It is certified that error appears in the above-identified patent and that said Letters Patent is hereby corrected as shown below:

Column 17, line 36, after "storing" (first occurrence) insert --means--, and after "memory" delete "means".

Column 17, line 40, after "storing" (first occurrence) insert --means-- and after "memory" delete "means".

Signed and Sealed this

Third Day of April, 2001

Attest:

NICHOLAS P. GODICI

Attesting Officer     Acting Director of the United States Patent and Trademark Office